Patented Sept. 8, 1936

2,053,285

UNITED STATES PATENT OFFICE 2,053,285

METHOD OF FACILITATING PRODUCTION OF WELLS

John J. Grebe, Midland, Mich., assignor to The Dow Chemical Company, Midland, Mich., a corporation of Michigan No Drawing. Application September 30, 1935, Serial No. 42,880

23 Claims. (Cl. 166—21)

The invention relates to an improved method of facilitating and augmenting oil or gas flow into wells located in oil or gas producing formations by increasing the permeability of such formations.

It is a common observation that the rate of production of oil or gas wells declines more or less in time. Ordinarily it is assumed that a decline in production is due at least in part to the pores and fissures in the rock adjacent to the well bore becoming clogged with substances transported thereinto by the oil or gas, which substances are usually paraffin wax, and earth particles. Also, some wells do not produce at a satisfactory rate of flow due to the tightness of the formation. In such cases it has been the practice to introduce into the well an acid capable of attacking and dissolving constituents of the rock so as to increase its permeability and thereby permit the oil or gas to reach the well more readily.

The direct introduction of acid into a well according to the known methods, an example of which is described in U. S. Patent No. 1,877,504, however, does not always accomplish the desired degree of improvement in production.

The following example is illustrative of the decline in yield of an oil well and the effect of conventional acid treatments on the rate of production.

Acid treatment #I

Before treatment the well produced at the rate of 240 bbls. per week. The well was then treated in conventional manner with 500 gallons of 15 per cent inhibited hydrochloric acid solution, which treatment increased the production to 540 bbls. per week.

Acid treatment #II

Four months later the production had declined to about 150 bbls. per week. The well was then treated with 1000 gallons of 15 per cent inhibited hydrochloric acid in similar manner to the first treatment. The treatment resulted in increasing the output per week to 450 bbls.

Acid treatment #III

A year later the rate of production had declined to about 150 bbls. per week. The well was then treated again in conventional manner with 1000 gallons of 15 per cent inhibited hydrochloric acid, which treatment failed materially to increase the output thereof.

Inasmuch as oil reached the well at substantially the same rate after, as before, this last acid treatment and the acid became spent in the earth formation without affecting the production rate, it appears, therefore, that by such use of acid the channels or passages leading from more outlying productive earth were not enlarged for a sufficient distance from the well bore to extend the producing horizon and increase the flow of oil or gas to the well.

I then carried out the following novel treatment on the same well eleven months after the last-mentioned conventional acid treatment. At this time the production had declined to about 54 bbls. per week. Liquid was standing in the base of the well, consisting of oil mixed with some water. Natural gas was pumped into the well through the casing for two hours until the pressure in the casing reached 135 lbs./sq. in., the pump tube being closed at the upper end. The volume of gas pumped in was sufficient to force a large amount into the surrounding rock. Then 110 gallons of a 15 per cent aqueous solution of calcium chloride was introduced into the well against the pressure therein. Additional gas was then pumped into the well, after which 1000 gallons of 15 per cent inhibited hydrochloric acid was introduced against the pressure in the well. Gas was again pumped in to force the acid out of the well bore into the formation and then the well was closed in until the acid was spent upon the rock formation. On putting the well into production by pumping the output was increased to 174 bbls. per week, or about 120 bbls. more than before the treatment.

I thus discovered that, if a gas not readily condensable under the pressure used was forced into a well under sufficient pressure to pass into the rock formation in the presence of liquid therein or introduced thereinto, and then a charge of reagent capable of increasing the permeability of the formation to the flow of fluids was introduced into the well against the pressure so created, a substantial increase in output was had, when the well was put into production. Such treatment, I found, was effective to increase the output of a well which could no longer be improved by the conventional use of acid therein.

An increase of output has been obtained in treating other wells according to the foregoing method, the essential steps of which may be defined as the following:—(1) introducing a gas into the well in the presence of liquid so as to build up a back pressure in the surrounding rock, and (2) introducing a charge of a reagent capable of increasing the permeability of the earth to the flow of fluids. The well is put into production after the reagent has sufficiently acted upon the earth or rock formation.

Accordingly, the principal object of the invention is to provide an improved method of the aforesaid character for increasing the output of wells. Other objects and advantages will be apparent as the description proceeds. To the accomplishment of the foregoing and related ends, the invention, then, consists of the method hereinafter fully described and particularly pointed out in the claims.

The theory on which the above-described novel treatment was based assumes that there is both relatively porous and relatively non-porous rock or earth comprising the producing stratum, and that the relatively porous earth has given up that oil which can naturally drain therefrom to the well. As a consequence in a conventional acid treatment the acid, following the line of least resistance, merely acts upon the relatively porous rock, and since this is already drained of oil, increasing its porosity cannot increase the output therefrom. Inasmuch as I have observed that oil still drained into an oil well at substantially the same rate before as after a conventional acid treatment, it appears reasonable to assume that there is productive earth or rock in communication with the well, but more or less remotely located therefrom, which rock is relatively non-porous compared to the rock adjacent to the well bore, into which the acid will naturally pass when introduced into the well in the conventional manner. It is also reasonable to assume further that, if the acid could be prevented from entering the relatively porous non-productive earth and at the same time be put under sufficient pressure to force it into the relatively non-porous productive rock, the permeability of the latter and, therefore, the production therefrom could be increased.

When in my novel process I obtained an increase in production by introducing gas into the well in the presence of liquid therein and then a charge of acid, it is believed that the Jamin action is developed in the porous non-productive rock, creating a resistance to the passage of fluid therein which prevents the acid charge from entering such earth. The Jamin action may be defined as the phenomenon which occurs when a liquid is forced into or through a permeable medium by means of a gas which also enters the medium but does not condense under the pressure employed. In such case the liquid forms innumerable menisci bridging the pores in the medium, which menisci are separated by bubbles or pockets of gas. In the aggregate the menisci are capable of resisting high pressure, even enormous pressures, when it is attempted to displace them by the application of gas or liquid pressure. It seems reasonable to suppose that the Jamin action will occur in any permeable portion of the formation in an oil well through which a gas-liquid mixture is forced, thereby developing a steadily increasing back pressure until equilibrium is established, when the resistance to the passage of fluid into all parts of the formation will be equalized, at least temporarily.

However, this resistance does not remain equalized when the reagent is introduced owing to the difference between the rock pressure in the relatively tight productive portions of the formation and that in the relatively porous portions, which have been drained of oil as far as possible by producing the well, and to the difference in degree to which the Jamin action develops in these different portions of the formation. Thus, on the one hand, there are relatively tight portions of the formation capable of producing oil which exists therein under comparatively high rock pressure and, on the other, there are relatively porous portions, the oil in which, if any, is under little or no rock pressure since these portions have been drained of oil. When the reagent is introduced into the well against the back pressure therein, it has to overcome, on the one hand, a pressure more or less equal to the rock pressure to enable it to pass into the oil-producing portions of the formation, and, on the other, it has to overcome the back pressure created by the Jamin action to pass into the more porous drained portions. If the reagent enters the porous portions of the formation, it forces the liquid-gas mixture further into the outlying and smaller pores thereby increasing the back pressure therein due to the Jamin action which automatically increases the resistance to passage of the reagent thereinto. Hence, a higher pressure can be put upon the reagent to force it into the more dense portions in which the Jamin action is not created to the same extent, if at all. Furthermore, as the reagent attacks the more dense portions of the formation, the resistance to passage thereinto decreases due to the fact that the reagent increases the permeability of the formation, so that the pressure to be overcome is practically the same as the rock pressure, which is constant as compared to the Jamin action back pressure which increases as additional pressure is applied. Thus the reagent on being introduced into the well meets a back pressure which, in the porous portions, has a positive or increasing coefficient, while in the more tight portions it has a negative or decreasing coefficient. Hence the reagent, following the line of least resistance, will be forced into the more dense portions of the formation, in which oil is contained, rather than into the more porous open portions. The foregoing theoretical explanation is believed to describe more or less accurately the conditions produced in an oil-bearing formation of the type in question when treated according to the present method. However, what actually happens in the formation never can be fully ascertained, and I do not wish to limit the invention by any theory set up in explanation of the observed facts.

In carrying out the invention the following steps are performed:—1. A gas not condensable under the pressure employed is forced into the well in sufficient volume to pass into the surrounding rock formation, either in the presence of liquid already therein or of liquid introduced into the well along with the gas, whereby to force liquid along with gas into the formation and develop a back pressure. It is preferable to introduce the gas through the casing and the liquid through the tubing, although these fluids may be introduced through the tubing and casing, respectively, or through either, if desired. The gas at first may be introduced alone until a substantial back pressure is developed and then, if necessary, liquid may be added so as to assist liquid present in the formation in developing the back pressure. The back pressure is allowed to reach a value preferably equal to about twice the normal rock pressure of the field, although lower pressures have been found to be useful. As aforesaid, theoretically the introduction of gas into the earth in the presence of liquid creates the Jamin action. For convenience, the above-described operation may be referred to as "creating the Jamin action". 2. A charge of reagent capable of increasing the permeability of the earth to the flow of fluids is introduced into the well against the pressure therein and forced into the surrounding earth by the application of higher pressure, if necessary. Such reagent is preferably an aqueous acid solution capable of forming water-soluble salts with the earth formation, e. g. hydrochloric acid, although solvents for paraffin such as carbon tetrachloride, naphtha, etc., may be used when the passages are clogged with paraffin.

After the reagent has been introduced into the well it is preferable to keep the same closed to give the reagent sufficient time to act upon the rock before putting the well into production. Inasmuch as considerable time is usually spent in introducing the reagent into the formation and in putting the well into production thereafter, it is not always necessary to close in the well for any longer time than that required to carry out the above operations. Beneficial results, therefore, can often be had simply by releasing the pressure and putting the well into production after the reagent has been introduced.

It is usually advantageous to confine the action of the reagent employed to the rock above the bottom of the well by introducing thereinto, before the above treatment is applied, a substance which will close the pores and passages in the underlying earth. For this purpose a liquid having a higher specific gravity than that of the acid may be used by introducing it into the well ahead of the acid, as disclosed in U. S. Patent No. 1,916,122.

Various liquids in conjunction with gas as aforesaid may be used to create the Jamin action. Such liquids may be non-aqueous or aqueous and, if the latter, may be acid, neutral, or alkaline in reaction. The greater the surface tension of the liquid, the greater will be the back pressure resulting from the Jamin action. Water, which has a relatively high surface tension, is suitable, although better results are had when a soluble substance is dissolved in the water that increases its surface tension. Any suitable concentration may be used. The brines often available in oil fields which possess a higher surface tension than water, due to their soluble salt content, are thus suitable for the purpose. The same aqueous solutions which are suitable for closing the pores and passages of the earth below the bottom of the well, as aforesaid, may be used also to create the Jamin action.

The effectiveness of any of the foregoing aqueous liquids to create the Jamin action can be increased by the addition of an agent that promotes foaming or frothing of the liquid, particularly if its surface tension is comparable to, or greater than, that of water and not greatly reduced by the foam-producing agent. The tendency for water or aqueous solutions to foam generally can be increased by the addition of a comparatively small amount of a foam-producing agent, examples of which are gelatine, saponin, gum arabic, casein, peptone, licorice, and the like. A suitable concentration is between about 0.05 and 2 per cent by weight of the liquid, although other proportions may be used. Acids also increase the tendency for aqueous solutions to foam when introduced into the earth along with gas, due to the formation of gas bubbles when the acid acts upon the earth solids that are decomposable by the acid to yield a gas. The foaming that results tends to improve the distribution of the liquid in the relatively porous rock as the gas is introduced and so improve the creation of the Jamin action. The Jamin action, therefore, can be created more effectively when the liquid has an acid reaction or when it contains a foam-producing agent than when it is neutral, alkaline, or free from foam-producing agents. Oil or the like is also suitable for creating the Jamin action, but, owing to its relatively low surface tension, it is less effective than water or aqueous solutions.

The amount of liquid required to create the Jamin action depends upon the degree of porosity of the earth and the magnitude of the back pressure it is desired to create. The liquid naturally present in the formation is often sufficient to create the Jamin action when gas is introduced, so that additional liquid may not be required in some cases. However, the rate of increase in back pressure produced on introducing gas at a more or less constant rate serves as an indication of whether there is sufficient liquid in the formation. Hence, if the rate of increase in back pressure remains more or less constant until the desired back pressure is attained, then there is sufficient liquid. On the other hand, if the rate of rise in pressure decreases markedly or approaches zero before the desired back pressure is obtained, additional liquid may be required. The gas and liquid may be introduced simultaneously, alternately, or intermittently, although it is preferable to introduce the liquid in small portions, while the gas is introduced at a more or less constant rate to produce the desired back pressure. It is thus usually possible to create almost any desired back pressure. The maximum pressure that can be developed, of course, is limited to that under which the gas used condenses. Air, carbon dioxide, or natural gas and the like may be used for the purpose, although other difficultly liquefiable gases may be used. Natural gas or carbon dioxide are preferable to air, owing to the risk of forming an explosive mixture in the well when air is used.

The effectiveness of the Jamin action to seal the relatively porous earth may be ascertained by closing in the well and noting whether the pressure declines rapidly. When the decline is rapid it is an indication that additional liquid and gas should be introduced to increase the effectiveness of the seal in the earth. However, even though the pressure declines to some extent when the well is closed, it is an indication that the Jamin action has been created to a sufficient degree to aid materially in preventing the reagent to be subsequently introduced from entering the more porous earth. If, after repeated attempts to create a back pressure by means of the introduction of gas in the presence of liquid, a substantial back pressure is not created, it may be assumed that the formation of the earth is such that the process cannot be used satisfactorily therein.

The magnitude of the back pressure that is effective to prevent the entrance of reagent into the more porous portions of the rock formation from which the oil that naturally will drain therefrom has been removed, varies according to conditions peculiar to the formation involved. Generally it is sufficient to raise the pressure in the well to that which is about equal to, or greater than, that of the pressure head behind the oil in the formation. Such pressure is usually equal to the rock pressure of the field, although lower pressures may be useful. In most cases a back pressure equal to about twice the natural rock pressure of the field may be used as aforesaid.

After a sufficient back pressure is produced, the reagent capable of increasing the permeability of the formation is introduced into the bore of the well against the pressure therein and forced therefrom into the outlying parts of the formation by the application of pressure, as by pumping, for example, when the hydrostatic head of the reagent is insufficient to force it into the formation. If desired, the method described in U. S. Patent No. 1,891,667 may be used. In this method the tube and casing, if such are in the well, are filled with a liquid such as oil having a lower specific gravity than the reagent and then the reagent is introduced into the tube while drawing off liquid through the casing head. After the oil is displaced from the base of the well, the casing is closed and pressure applied to the reagent in the tube to force it therefrom into the surrounding earth. This procedure usually ensures the reagent entering the formation at the lower end of the well bore without reaching the casing seat.

The type of reagent to be employed depends upon the nature of the formation and conditions therein contributing to the decline or restriction of oil or gas flow. Where such difficulties are due to paraffin deposition, paraffin solvents may be used, such as carbon tetrachloride or other known solvents for paraffin. Acid solutions, however, will generally serve the purpose, inasmuch as these can be used to dissolve acid-soluble constituents from the rock and thereby increase the flow capacity of passages or channels therein regardless of the presence of paraffin. Solutions containing hydrochloric acid are particularly effective where the earth formation is composed of or contains substantial amounts of limestone, dolomite, or like acid-soluble material. It is preferable to dilute the acid with sufficient water to permit retaining in solution the salt or salts formed by the action of the acid on the formation. If hydrochloric acid be employed, a concentration between 4 and 22 per cent is suitable. By adding a relatively small amount of an agent capable of inhibiting the action of the acid on the metals, damage to metal parts of the well by the acid may be prevented.

After the reagent has completed its action upon the earth formation, the well is put back into production by pumping or the like or allowing the well to flow.

In brief, the treatment contemplated by my process comprises forcing a relatively permanent gas into the well in the presence of liquid, whereby back pressure results, and thereafter introducing into the well and thence into the formation against the back pressure therein, a reagent capable of increasing the permeability of the formation, after which the well may be put into production. As a result of such sequence of operations, it is usually possible to treat wells with a smaller charge of reagent than is conventionally employed, the reagent may be forced for considerable distances beyond the immediate vicinity of the well bore, and waste of reagent is to a large extent prevented as it is prevented from entering the relatively porous and usually non-productive earth. In cases where the well produces both gas and oil I have found that the method has the effect usually of increasing the output of oil to a greater extent than that of gas, hence by my method the ratio of oil output to gas output may be increased.

This application is a continuation-in-part of my prior applications Serial No. 4,533, filed February 1, 1935; Serial No. 23,950, filed May 28, 1935; and Serial No. 23,951, filed May 28, 1935.

Other modes of applying the principle of my invention may be employed instead of those explained, change being made as regards the method herein disclosed, provided the steps stated by any of the following claims or the equivalent of such stated steps be employed.

I therefore particularly point out and distinctly claim as my invention:

1. In a method of treating a well, the steps which comprise introducing into the well a gas, whereby a back pressure is developed, and introducing into the well against the pressure therein a reagent capable of increasing the permeability of the formation.

2. In a method of treating a well, the steps which comprise introducing into the well a gas and a liquid, whereby a back pressure is developed, and introducing into the well against the pressure therein a reagent capable of increasing the permeability of the formation.

3. In a method of treating a well, the steps which comprise introducing into the well a gas in the presence of liquid, whereby a back pressure is developed, and introducing into the well against the pressure therein a reagent capable of increasing the permeability of the formation.

4. In a method of treating a well, the steps which comprise introducing into the well a gas and an aqueous solution, whereby a back pressure is developed, and introducing into the well against the pressure therein a reagent capable of increasing the permeability of the formation.

5. In a method of treating a well, the steps which comprise introducing into the well a gas in the presence of an aqueous solution, whereby a back pressure is developed, and introducing into the well against the pressure therein a reagent capable of increasing the permeability of the formation.

6. In a method of treating a well, the steps which comprise introducing into the well a gas in the presence of an aqueous acid solution, whereby a back pressure is developed, and introducing into the well against the pressure therein a reagent capable of increasing the permeability of the formation.

7. In a method of treating a well, the steps which comprise introducing into the well a gas in the presence of an aqueous salt solution, whereby a back pressure is developed, and introducing into the well against the pressure therein a reagent capable of increasing the permeability of the formation.

8. In a method of treating a well, the steps which comprise introducing into the well a gas in the presence of an aqueous solution containing a foam-producing agent, whereby a back pressure is developed, and introducing into the well against the pressure therein a reagent capable of increasing the permeability of the formation.

9. In a method of treating a well, the steps which comprise introducing into the well a gas in the presence of an aqueous solution containing an agent capable of increasing the surface tension of water, whereby a back pressure is developed, and introducing into the well against the pressure therein a reagent capable of increasing the permeability of the formation.

10. In a method of treating a well, the steps which comprise introducing into the well a gas and an aqueous acid solution, whereby a back pressure is developed, and introducing into the well against the pressure therein a reagent capable of increasing the permeability of the formation.

11. In a method of treating a well, the steps which comprise introducing into the well a gas, whereby a back pressure is developed, and introducing into the well against the pressure therein a solution containing hydrochloric acid.

12. In a method of treating a well, the steps which comprise introducing into the well a gas in the presence of an acid solution, whereby a back-pressure is developed, and introducing into the well against the pressure therein a charge of a reagent comprising hydrochloric acid.

13. In a method of treating a well, the steps which comprise introducing a gas under pressure while introducing a liquid, whereby a back pressure is developed, and introducing into the well against the pressure therein a charge of a reagent comprising hydrochloric acid.

14. In a method of treating a well, the steps which comprise introducing a gas under pressure while introducing an aqueous solution, whereby a back pressure is developed, and introducing into the well against the pressure therein a charge of a reagent comprising hydrochloric acid.

15. In a method of treating a well, the steps which comprise introducing a gas under pressure while introducing an aqueous acid solution, whereby a back pressure is developed, and introducing into the well against the pressure therein a charge of a reagent comprising hydrochloric acid.

16. In a method of treating a well, the steps which comprise introducing a gas under pressure in the presence of a foam-producing agent and a liquid, whereby a back pressure is developed, then introducing into the well against the pressure therein a reagent capable of increasing the permeability of the formation.

17. In a method of treating a well, the steps which comprise introducing a gas under pressure in the presence of a liquid and a foam-producing agent, whereby a back pressure is developed, then introducing into the well against the pressure therein a reagent comprising hydrochloric acid.

18. In a method of treating a well, the steps which comprise introducing a gas under pressure and a liquid containing a foam-producing agent, whereby a back pressure is developed, then introducing into the well against the pressure therein a reagent capable of increasing the permeability of the formation.

19. In a method of treating a well, the steps which comprise introducing a gas under pressure and a liquid containing a foam-producing agent, whereby a back pressure is developed, then introducing into the well against the pressure therein a reagent comprising hydrochloric acid.

20. In a method of treating a well, the steps which comprise introducing a gas under pressure and an aqueous liquid containing an agent capable of increasing the surface tension of water, whereby a back pressure is developed, then introducing into the well against the pressure therein a reagent capable of increasing the permeability of the formation.

21. In a method of treating a well, the steps which comprise introducing a gas under pressure into the bore of the well in the presence of liquid until a back pressure is developed which does not decline rapidly when the well is closed, introducing into the well against the pressure therein a reagent capable of increasing the permeability of the formation to the flow of fluids, said reagent being under sufficient pressure to be forced into the contiguous earth, closing in the well to permit the reagent to act upon the formation, and putting the well into production.

22. In a method of treating a well, the steps which comprise introducing natural gas under pressure into the well in the presence of water until a back pressure is developed which does not decline rapidly when the well is closed, introducing into the well against the pressure therein a reagent capable of increasing the permeability of the formation to the flow of fluids, said reagent being under sufficient pressure to be forced into the contiguous earth, closing in the well to permit the reagent to act upon the formation, and putting the well into production.

23. In a method of treating a well, the steps which comprise introducing natural gas under pressure into the well in the presence of an aqueous solution until a back pressure is developed which does not decline rapidly when the well is closed, introducing into the well hydrochloric acid solution against the pressure therein, said solution being under sufficient pressure to be forced into the contiguous earth, closing in the well to permit the acid to act upon the formation, and putting the well into production.

JOHN J. GREBE.